United States Patent
Lee et al.

(10) Patent No.: US 10,919,433 B1
(45) Date of Patent: Feb. 16, 2021

(54) RESTRAINT ASSEMBLY FOR CARGO SYSTEM

(71) Applicant: GOODRICH CORPORATION, Charlotte, NC (US)

(72) Inventors: Brandon Lee, Wahpeton, ND (US); Mark L Olson, Jamestown, ND (US)

(73) Assignee: GOODRICH CORPORATION, Charlotte, NC (US)

(*) Notice: Subject to any disclaimer, the term of this patent is extended or adjusted under 35 U.S.C. 154(b) by 0 days.

(21) Appl. No.: 16/539,203

(22) Filed: Aug. 13, 2019

(51) Int. Cl.
| | |
|---|---|
| *B60P 7/13* | (2006.01) |
| *B64D 9/00* | (2006.01) |
| *B60P 7/08* | (2006.01) |
| *B60P 7/10* | (2006.01) |
| *B64D 1/12* | (2006.01) |
| *B65G 13/11* | (2006.01) |
| *B64D 1/10* | (2006.01) |

(52) U.S. Cl.
CPC .............. *B60P 7/13* (2013.01); *B60P 7/0815* (2013.01); *B60P 7/0892* (2013.01); *B60P 7/10* (2013.01); *B64D 9/003* (2013.01); *B64D 1/10* (2013.01); *B64D 1/12* (2013.01); *B64D 2009/006* (2013.01); *B65G 13/11* (2013.01)

(58) Field of Classification Search
CPC .......... B64D 9/003; B60P 7/13; B65G 13/12; B65D 2009/006
USPC ......................................................... 410/77
See application file for complete search history.

(56) References Cited

U.S. PATENT DOCUMENTS

| | | | | |
|---|---|---|---|---|
| 3,377,040 A | * | 4/1968 | Hansen ................... | B64D 9/003 |
| | | | | 410/79 |
| 3,693,920 A | * | 9/1972 | Trautman ............... | B64D 9/003 |
| | | | | 410/77 |
| 3,759,476 A | | 9/1973 | Goodwin | |
| 3,986,460 A | | 10/1976 | Voigt et al. | |
| 4,049,286 A | | 9/1977 | Francis, Jr. | |

(Continued)

FOREIGN PATENT DOCUMENTS

| | | | | |
|---|---|---|---|---|
| AU | 6712381 | | 8/1981 | |
| DE | 2652441 A1 | * | 5/1977 | ............. B64D 9/003 |

(Continued)

OTHER PUBLICATIONS

European Patent Office, European Search Report dated Apr. 29, 2019 in Application No. 19150916.5.

(Continued)

*Primary Examiner* — Hilary L Gutman
(74) *Attorney, Agent, or Firm* — Snell & Wilmer L.L.P.

(57) ABSTRACT

A restraint assembly includes a lateral restraint comprising a guide face, wherein the lateral restraint is configured to be rotatably coupled to a tray of the cargo system. The restraint assembly also includes a vertical restraint rotatably coupled to the lateral restraint. The restraint assembly is configured to have a stored position and a raised position. In the stored position, both the lateral restraint and the vertical restraint are configured to be disposed within a volume defined by the tray of the cargo system. In the raised position, the vertical restraint and at least the guide face of the lateral restraint are configured to be disposed above the volume defined by the tray of the cargo system such that the restraint assembly provides at least one of longitudinal guidance, lateral restraint, and vertical restraint to cargo.

17 Claims, 8 Drawing Sheets

(56) References Cited

U.S. PATENT DOCUMENTS

| | | | |
|---|---|---|---|
| 4,077,590 A | 3/1978 | Shorey | |
| 4,089,275 A * | 5/1978 | Pelletier | B60P 7/13 |
| | | | 410/79 |
| 4,144,821 A * | 3/1979 | Lang | B64D 9/003 |
| | | | 410/79 |
| 4,331,412 A | 5/1982 | Graf | |
| 4,395,172 A | 7/1983 | Hoener et al. | |
| 4,457,649 A | 7/1984 | Vogg et al. | |
| 4,867,622 A | 9/1989 | Brown | |
| 5,000,635 A | 3/1991 | Jensen et al. | |
| 5,112,173 A * | 5/1992 | Eilenstein | B64D 9/003 |
| | | | 410/77 |
| 5,131,606 A | 7/1992 | Nordstrom | |
| 5,265,991 A * | 11/1993 | Herrick | B64D 9/003 |
| | | | 244/118.1 |
| 5,316,242 A | 5/1994 | Eilenstein-Wiegmann et al. | |
| 5,564,654 A * | 10/1996 | Nordstrom | B64D 9/003 |
| | | | 244/118.1 |
| 5,573,359 A * | 11/1996 | Moradians | B60P 7/08 |
| | | | 410/69 |
| 5,816,758 A * | 10/1998 | Huber | B64D 9/003 |
| | | | 410/77 |
| 5,957,406 A | 9/1999 | Nelson | |
| 6,051,133 A | 4/2000 | Huber | |
| 6,270,300 B1 * | 8/2001 | Huber | B60P 7/13 |
| | | | 244/118.1 |
| 6,413,029 B1 | 7/2002 | Kernkamp | |
| 6,425,717 B1 | 7/2002 | Saggio | |
| 6,485,238 B2 | 11/2002 | Segura | |
| 6,557,800 B2 | 5/2003 | Medina | |
| 6,729,818 B1 * | 5/2004 | Yee | B60P 7/0815 |
| | | | 410/69 |
| 6,926,481 B2 | 8/2005 | Huber | |
| 7,086,517 B2 | 8/2006 | Clos | |
| 7,344,013 B2 | 3/2008 | Krueger | |
| 7,435,043 B2 * | 10/2008 | Brekken | B64D 9/003 |
| | | | 410/69 |
| 7,665,938 B2 * | 2/2010 | Schulze | B64C 1/20 |
| | | | 410/80 |
| 7,731,460 B2 | 6/2010 | Brown | |
| 7,922,431 B2 * | 4/2011 | Schulze | B64D 9/003 |
| | | | 410/80 |
| 8,066,458 B2 | 11/2011 | Schulze et al. | |
| 8,256,602 B2 | 9/2012 | Huber et al. | |
| 8,585,334 B2 | 11/2013 | Moradians | |
| 8,926,243 B2 | 1/2015 | Schulze | |
| 9,932,113 B1 | 4/2018 | Larson | |
| 10,106,239 B2 | 10/2018 | Woodland | |
| 10,118,700 B2 | 11/2018 | Kuppan | |
| 10,293,939 B2 | 5/2019 | Conejero Moreno | |
| 10,432,127 B1 * | 10/2019 | Harms | B64C 1/20 |
| 2004/0265085 A1 | 12/2004 | Mayer | |
| 2007/0086870 A1 | 4/2007 | Schulze | |
| 2007/0237598 A1 | 10/2007 | Schulze | |
| 2008/0310944 A1 | 12/2008 | Stegmiller | |
| 2009/0016838 A1 * | 1/2009 | Roberts | B60P 7/0892 |
| | | | 410/69 |
| 2010/0143063 A1 | 6/2010 | Dugic | |
| 2011/0150594 A1 | 6/2011 | Schulze | |
| 2011/0176903 A1 * | 7/2011 | Schulze | B64D 9/003 |
| | | | 414/800 |
| 2012/0037753 A1 | 2/2012 | Huber et al. | |
| 2013/0259593 A1 * | 10/2013 | Moradians | B64D 9/003 |
| | | | 410/77 |
| 2016/0001870 A1 | 1/2016 | Moradians et al. | |
| 2017/0197717 A1 | 7/2017 | Trisotto | |
| 2018/0056848 A1 * | 3/2018 | Koehler | B65G 13/075 |
| 2018/0222586 A1 | 8/2018 | Shivalinga | |
| 2018/0273177 A1 | 9/2018 | Jayaprakash | |
| 2019/0061945 A1 | 2/2019 | Quixano Mendez | |
| 2019/0210728 A1 * | 7/2019 | Pfau | B65G 13/12 |
| 2019/0256227 A1 * | 8/2019 | Balasubramanian | B64D 9/003 |
| 2020/0140088 A1 * | 5/2020 | Harms | G01P 13/00 |

FOREIGN PATENT DOCUMENTS

| | | | | |
|---|---|---|---|---|
| DE | 102010035099 | | 2/2012 | |
| EP | 0616938 A1 * | 9/1994 | | B61D 45/007 |
| EP | 0881144 | | 12/1998 | |
| EP | 3508422 | | 7/2019 | |
| FR | 2918640 | | 1/2009 | |
| FR | 2918641 | | 1/2009 | |
| GB | 2436715 | | 10/2007 | |
| GB | 2440062 A * | 1/2008 | | B64D 9/003 |
| GB | 2440063 A * | 1/2008 | | B64D 9/003 |
| GB | 2440064 A * | 1/2008 | | B60P 7/0815 |
| WO | 2004054876 | | 7/2004 | |

OTHER PUBLICATIONS

USPTO, Non-Final Office Action dated Jun. 27, 2019 in U.S. Appl. No. 15/866,241.
USPTO, Notice of Allowance dated Dec. 17, 2019 in U.S. Appl. No. 15/866,241.
European Patent Office, European Search Report dated Jun. 26, 2020 in Application No. 19213585.3.
European Patent Office, European Search Report dated Jul. 10, 2020 in Application No. 19214487.1.
European Patent Office, European Search Report dated Jul. 21, 2020 in Application No. 19216272.5.
USPTO, Pre-Interview First Office Action dated Sep. 30, 2020 in U.S. Appl. No. 16/539,224.

* cited by examiner

RESTRAINT ASSEMBLY FOR CARGO SYSTEM

FIELD

The present disclosure relates to cargo systems, and more specifically to a longitudinal guide and lateral restraint assembly for cargo systems.

BACKGROUND

Cargo handling systems, such as those used by aircraft for transport of containerized cargo or pallets, commonly referred to as unit load devices (ULDs), typically include longitudinal trays containing transport rollers, latches, and/or power drive units (PDU's) positioned along a cargo bay floor to facilitate movement of the ULDs relative to the bay floor. For example, cargo may be loaded from an entrance of the aircraft and transported by the cargo system along a conveyance plane to forward or aft locations, depending upon the configuration of the aircraft.

Cargo systems may benefit from having one or more features to facilitate guidance and/or restraint of the cargo. For example, conventional cargo guidance/restraining systems may include a continuous vertical restraint lip that extends along a side of a track or guide rail. However, a system may require longitudinal guidance, lateral restraint, and/or vertical restraint of ULD's where one or both of the longitudinal edges of the ULD's are positioned such that the guidance and/or restraint is provided along a longitudinal tray.

SUMMARY

In various embodiments, the present disclosure provides a restraint assembly of a cargo system. As used herein, the term "restraint assembly" generally refers to an assembly that provides guidance and/or restraint to cargo. The restraint assembly may include a lateral restraint comprising a guide face, wherein the lateral restraint is configured to be rotatably coupled to a tray of the cargo system. For example, the restraint assembly may include base, and the base may be mounted to the cargo system. As used herein, the lateral restraint may provide longitudinal guidance and/or lateral restraint to cargo, as described in greater detail below. The restraint assembly may also include a vertical restraint rotatably coupled to the lateral restraint. The restraint assembly may comprise a stored position and a raised position. In the stored position, both the lateral restraint and the vertical restraint are configured to be disposed within a volume defined by the tray of the cargo system (e.g., below a conveyance plane defined by the top of the rollers). In the raised position, the vertical restraint and at least the guide face of the lateral restraint are configured to be disposed above the volume defined by the tray of the cargo system such that the restraint assembly provides at least one of longitudinal guidance, lateral restraining, and vertical restraining to cargo.

In various embodiments, the lateral restraint comprises a top edge, as defined with the restraint assembly in the raised position. The vertical restraint may be rotatably coupled to the top edge of the lateral restraint. In various embodiments, the tray of the cargo system extends along a longitudinal axis. The lateral restraint may be configured to be coupled to the tray via a first rotational axis. The first rotational axis may be parallel to the longitudinal axis. In various embodiments, the vertical restraint is coupled to the lateral restraint via a second rotational axis, and the second rotational axis is parallel to the longitudinal axis.

In various embodiments, the lateral restraint comprises a reverse face opposite the guide face. In the stored position the vertical restraint is disposed and extends directly adjacent to the reverse face of the lateral restraint, according to various embodiments. In the raised position the vertical restraint is non-parallel with the lateral restraint and extends in a direction the guide face is facing, according to various embodiments. In various embodiments, toggling between the stored position and the raised position comprises rotating the vertical restraint, relative to the lateral restraint, more than 180 degrees. In various embodiments, toggling between the stored position and the raised position comprises rotating the vertical restraint, relative to the lateral restraint, about 270 degrees.

In various embodiments, a length of the guide face of the lateral restraint, as measured parallel to a longitudinal axis of the tray of the cargo system, is greater than a height of the guide face, the height being perpendicular to the length. In various embodiments, the guide face comprises at least one of a forward chamfer and an aft chamfer. In various embodiments, rotation of the lateral restraint relative to the tray and rotation of the vertical restraint relative to the lateral restraint are independently actuatable. In various embodiments, rotation of the lateral restraint relative to the tray is configured to trigger rotation of the vertical restraint relative to the lateral restraint.

Also disclosed herein, according to various embodiments, is a cargo system. The cargo system may include a tray defining a volume within which one or more rollers are housed, wherein the rollers are configured to facilitate movement of cargo along a longitudinal axis the tray. The cargo system may also include a restraint assembly rotatably coupled to the tray. The restraint assembly may comprise a stored position and a raised position, wherein in the stored position the restraint assembly is disposed within the volume defined by the tray and in the raised position the restraint assembly is disposed above the volume defined by the tray of the cargo system such that the restraint assembly provides at least one of longitudinal guidance, lateral restraint, and vertical restraint to the cargo.

In various embodiments, restraint assembly comprises a lateral restraint comprising a guide face, wherein the lateral restraint is rotatably coupled to the tray via a first rotational axis. In various embodiments, the lateral restraint is rotatably coupled to a base, which is mounted to the tray of the cargo system, and thus the first rotational axis may be defined between the lateral restraint and the base. The restraint assembly may also include a vertical restraint rotatably coupled to the lateral restraint via a second rotational axis. In various embodiments, both the first rotational axis and the second rotational axis are parallel to the longitudinal axis of the tray. The first rotational axis may be disposed on a side of the volume opposite the guide face of the lateral restraint in the raised position, or the first rotational axis may be disposed on a side of the volume that the guide face of the lateral restraint is facing in the raised position. The system may further include a support wedge disposed within the volume, wherein the restraint assembly comprises a tab configured to engage the support wedge in the raised position such that the support wedge provides a load path from the restraint assembly to the tray.

Also disclosed herein, according to various embodiments, is a method for guiding (and/or restraining) cargo. The method may include rotating a lateral restraint of a restraint assembly, relative to a tray of a cargo system, from a stored position to a raised position. The method may also include rotating a vertical restraint of the restraint assembly, relative to the lateral restraint, from the stored position to the raised position. In the stored position, the lateral restraint and vertical restraint are disposed within a volume defined by the tray of the cargo system and in the raised position the vertical restraint and at least a guide face of the lateral restraint are disposed above the volume. In various embodiments, rotating the vertical restraint comprises rotating the vertical restraint more than 180 degrees relative to the lateral restraint. In various embodiments, rotating the lateral restraint triggers rotation of the vertical restraint.

The forgoing features and elements may be combined in various combinations without exclusivity, unless expressly indicated herein otherwise. These features and elements as well as the operation of the disclosed embodiments will become more apparent in light of the following description and accompanying drawings.

Figure 1:
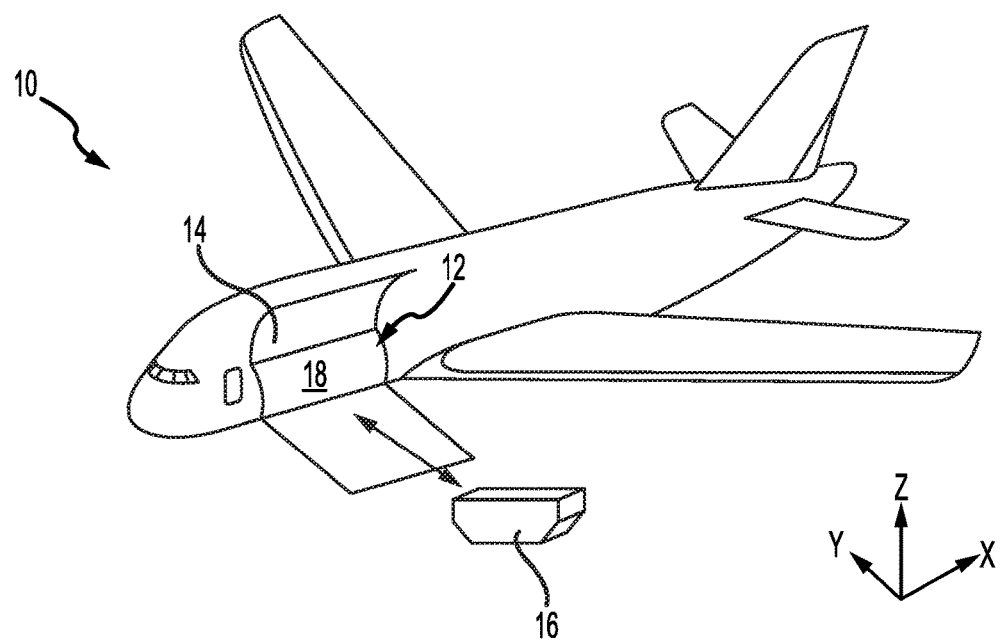
FIG. 1 illustrates a schematic view of an aircraft being loaded with cargo, in accordance with various embodiments.

The subject matter of the present disclosure is particularly pointed out and distinctly claimed in the concluding portion of the specification. A more complete understanding of the present disclosure, however, may best be obtained by referring to the detailed description and claims when considered in connection with the drawing figures.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the disclosure, it should be understood that other embodiments may be realized and that logical changes and adaptations in design and construction may be made in accordance with this disclosure and the teachings herein without departing from the spirit and scope of the disclosure. Thus, the detailed description herein is presented for purposes of illustration only and not of limitation.

As used herein, "aft" refers to the direction associated with the tail of an aircraft, or generally, to the direction of exhaust of the gas turbine. As used herein, "forward" refers to the direction associated with the nose of an aircraft, or generally, to the direction of flight or motion.

Cargo management systems, as disclosed herein, are used to load, move, and unload cargo. While numerous examples and details are included below with reference to aircraft cargo systems, it is expected that the present disclosure may apply to other, non-aircraft type cargo systems.

With reference to FIG. 1, an aircraft 10 is illustrated having a cargo compartment 12. A cargo door 14 provides access to cargo compartment 12 from outside aircraft 10. Cargo 16 (e.g., pallets, ULDs, luggage, etc.) may be loaded and unloaded through cargo door 14 and onto a cargo deck 18 of aircraft 10. In various embodiments, cargo deck 18 of the cargo system may be equipped with one or more power drive units (PDUs) configured to propel cargo 16 across cargo deck 18 in a desired direction.

Figure 2:
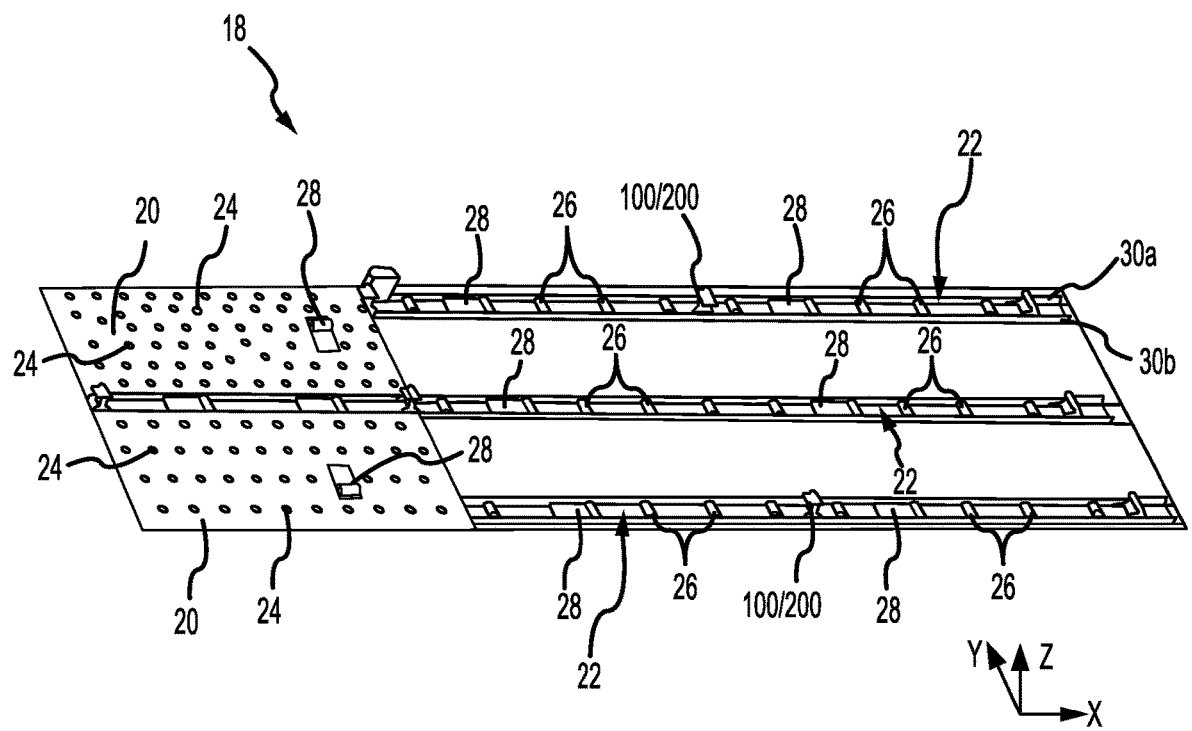
FIG. 2 illustrates a portion of an aircraft cargo deck, in accordance with various embodiments.

With reference to FIG. 2, a portion of cargo deck 18 is illustrated in greater detail. Cargo deck 18 may include one or more ball mats 20 and one or more trays 22. Ball mats 20 may include a plurality of freely rotating conveyance balls 24 and trays 22 may include a plurality of freely rotating conveyance rollers 26. In various embodiments, a number of PDUs 28 may be mounted along cargo deck 18. For example, PDUs 28 may be located in ball mats 20 and/or in roller trays 22. PDUs 28 may be configured to propel cargo over conveyance balls 24 and/or conveyance rollers 26 and across cargo deck 18. In accordance with various embodiments, a number of restraint assemblies 100 may be located along cargo deck 18. The restraint assemblies 100 generally provide longitudinal guidance and/or restraint to cargo items, such as ULDs. Accordingly, the term "restraint assembly" refers generally to an apparatus, device, or system that provides guidance and/or restraint to cargo. That is, the embodiments of the restraint assemblies 100/200 provided herein may be configured to provide guidance to cargo as it moves along the cargo system, to restrain and retain cargo once it is in a desired position, or to provide both guidance and restraint to cargo. The restraint assemblies 100 may be mounted to the trays 22, or could otherwise be implemented and/or mounted relative to a panel, a hogout, or other structure of a cargo system. For example, restraint assemblies 100 may be installed between a first rail 30a and a second rail 30b of tray 22. Second rail 30b may be parallel to first rail 30a. As described in greater detail below, the restraint assemblies 100 can be in a stored position when not needed, and can be transitioned to a raised position when cargo guidance/restraint is desired. In various embodiments, the trays 22 are coupled/mounted to an airframe of the aircraft.

In the stored position, the restraint assemblies 100 are disposed below/beneath the conveyance plane (e.g., in a volume 80 defined between first and second rails 30a, 30b that comprise the tray 22). In the raised position, the restraint assemblies 100 are disposed above the conveyance plane (e.g., above the volume defined between first and second rails 30a, 30b that comprise the tray 22). As used herein, the terms "beneath" or "below" refer to the negative Z-direction, and the term "above" refers to the positive Z-direction with respect to the conveyance surface/plane. In the raised position, one or more restraint assemblies 100 provide longitudinal guidance, lateral restraint, and vertical restraint. As used herein, the term "longitudinal" refers to directions along the x-axis, the term "lateral" refers to directions along the y-axis, and the term "vertical" refers to directions along the z-axis. The restraint assemblies 100 may be held or biased in either the stored or raised position (e.g., spring-loaded or latched). The restraint assemblies 100 may be controlled using actuators (e.g., motor driven actuators) and the restraint assemblies 100 may be reversibly locked into either position. The restraint assembly 100 may include a controller and a motor. In various embodiments, the restraint assembly 100 may be in mechanical communication with the restraint motor, which may be, for example, an electromagnetic, electromechanical or electrohydraulic actuator or other servomechanism. In various embodiments, the controller is configured to control operation of the restraint assembly 100. The restraint controller may include a processor and a tangible, non-transitory memory. The processor may comprise one or more logic modules that implement logic to control operation of the restraint assembly (e.g., switching between the stored and the raised positions.

In various embodiments, a human operator manipulates control elements to selectively and mechanically or electrically actuate the restraint assemblies 100. For example, a restraint assembly 100 may be actuated by a lever, latch, or other mechanical features disposed in proximity to the restraint assembly (e.g., hand or foot operable). Alternatively, the user/control interface may be mounted on a wall or other structure within the cargo bay or may be portable, e.g., the controls may be in a hand held device. In various embodiments, the cargo system may include one or more cargo shuttles that are configured to slide across floor panels or roll across the conveyance rollers 26. In various embodiments, the system controller may include a general purpose processor, a digital signal processor (DSP), an application specific integrated circuit (ASIC), a field programmable gate array (FPGA) or some other programmable logic device, discrete gate or transistor logic, discrete hardware components, or any combination thereof. The cargo handling system may also include a power source configured to supply power to the restraint assemblies 100 via one or more power busses.

Figure 3A:
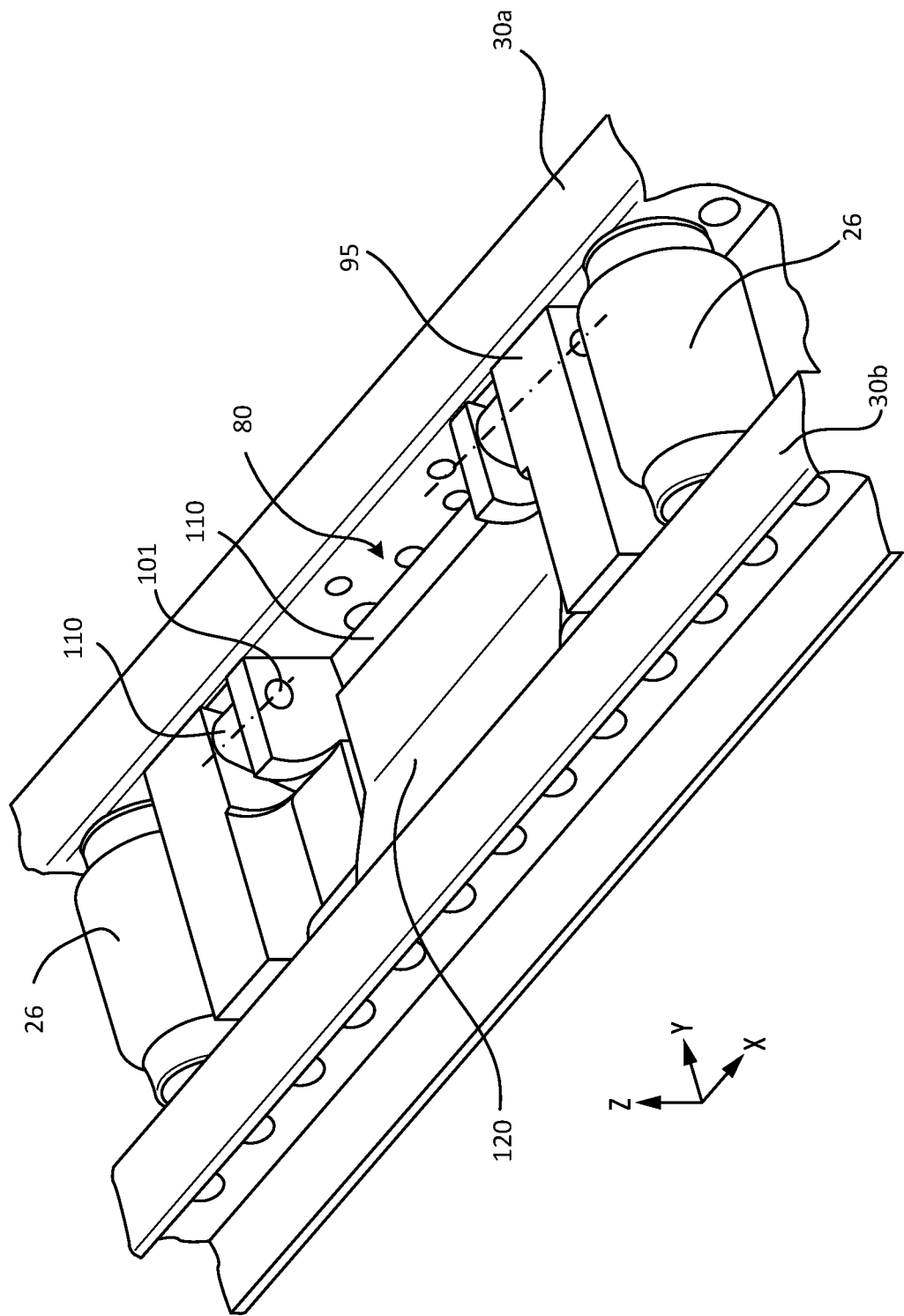
FIGS. 3A and 4A illustrate a restraint assembly, in a stored position, installed in a tray of a cargo system, in accordance with various embodiments.
Figure 3B:
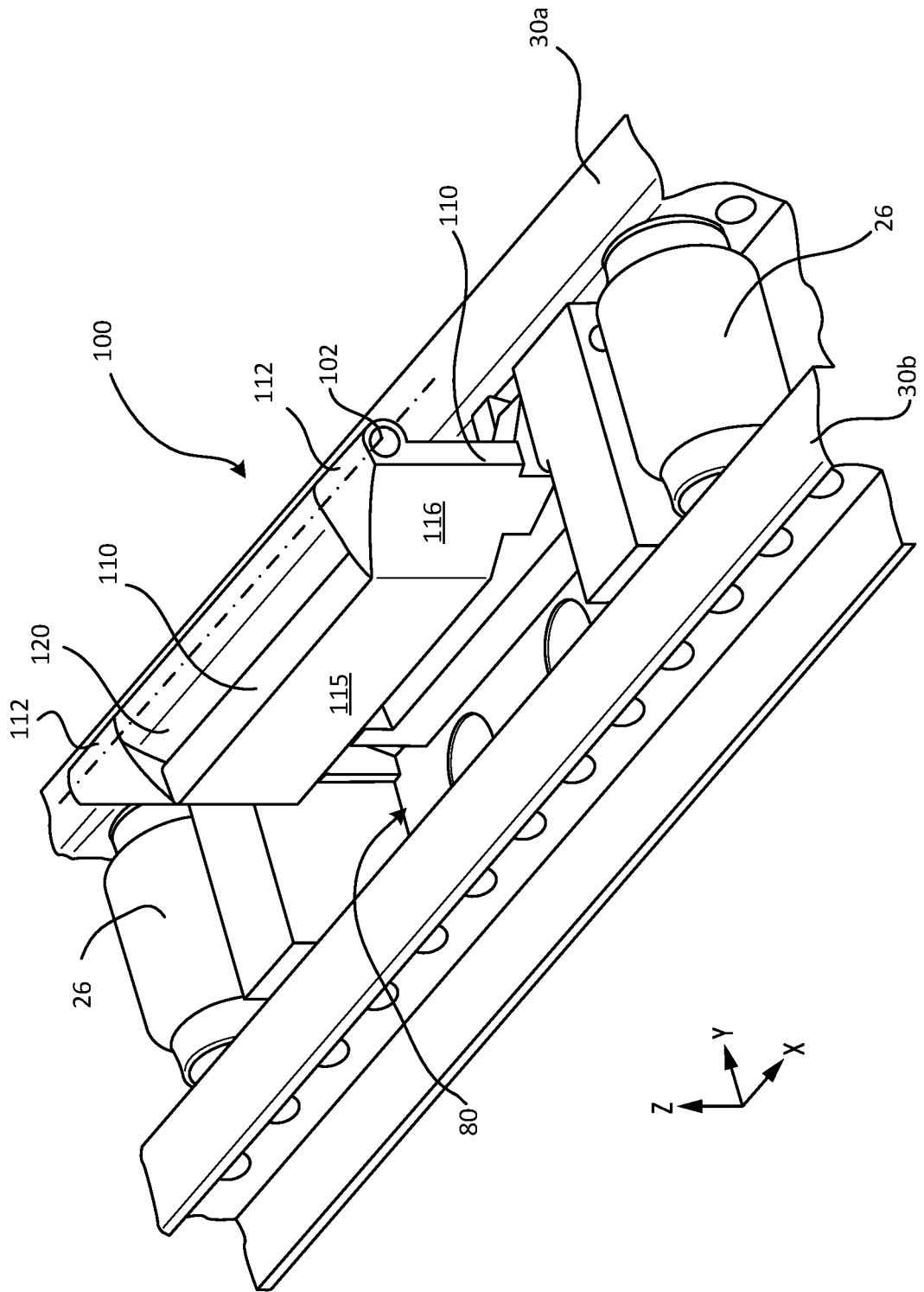
FIGS. 3B and 4B illustrate a restraint assembly, in a partially raised position, installed in a tray of a cargo system, in accordance with various embodiments.
Figure 3C:
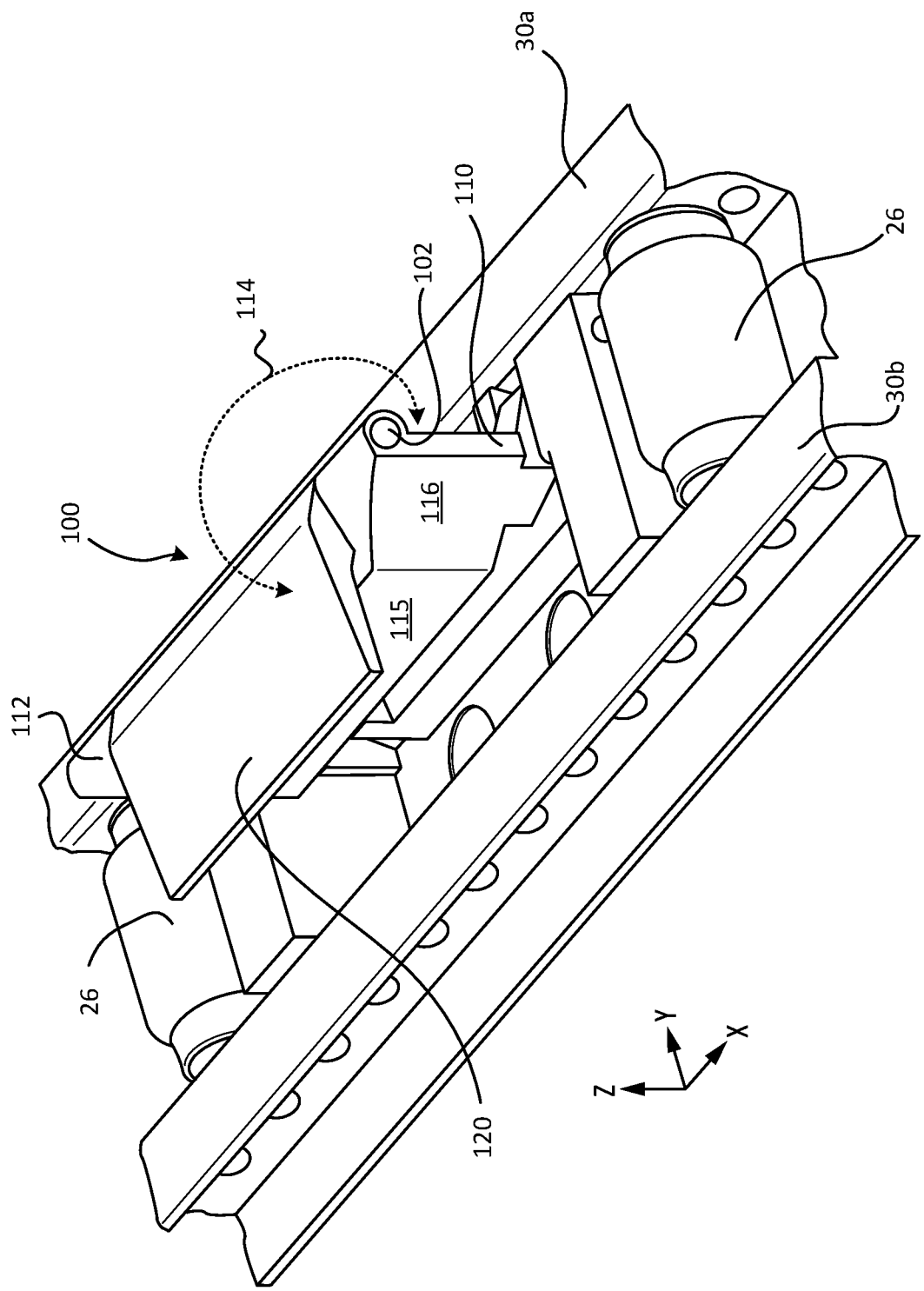
FIGS. 3C and 4C illustrate a restraint assembly, in a raised position, installed in a tray of a cargo system, in accordance with various embodiments.
Figure 4A:
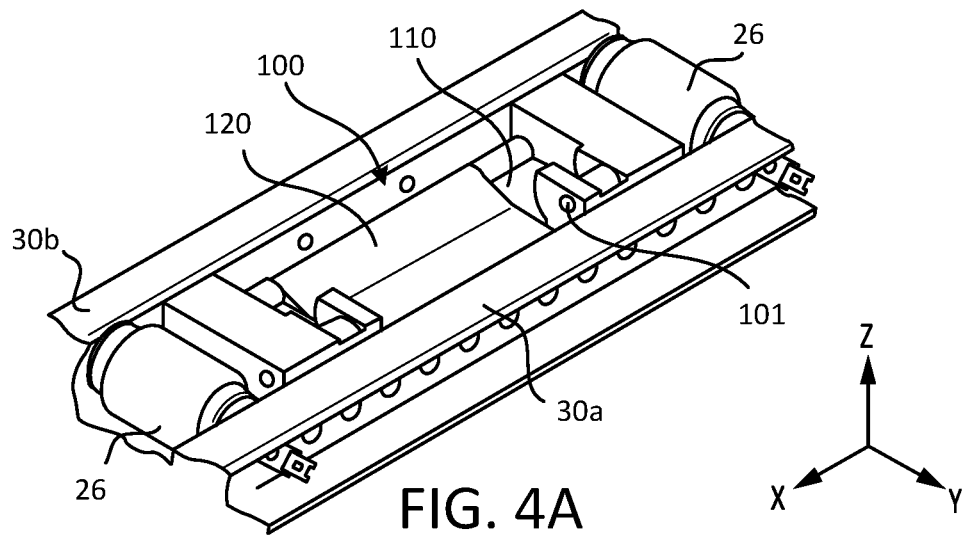
Figure 4B:
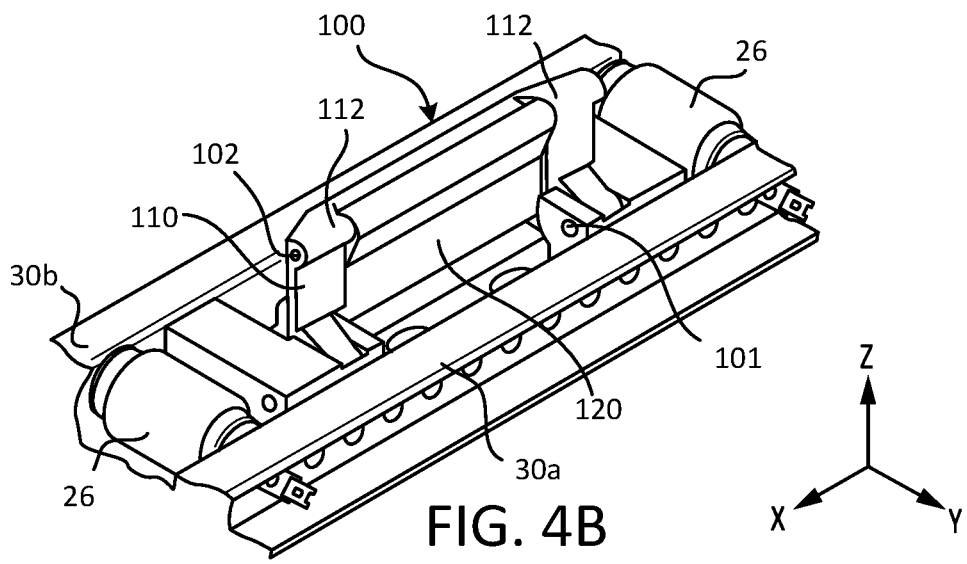
Figure 4C:
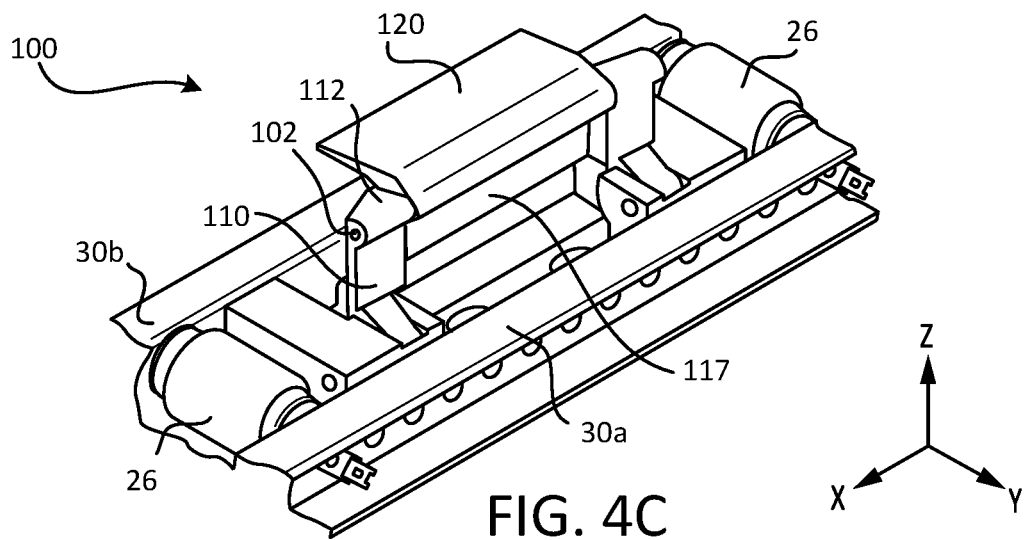

With reference to FIGS. 3C and 4C, the restraint assembly 100 generally includes a lateral restraint 110 and a vertical restraint 120. The term "lateral restraint" 110 refers generally to the portion of the restraint assembly 100 that provides lateral restraint and/or longitudinal guidance to the cargo (i.e., the modifier "lateral" does not refer to the orientation or extension direction of the restraint). That is, the lateral restraint 110 may provide guidance to cargo as it moves along the cargo system, may retain or restraint cargo once it is in a desired position, or may provide both guidance and restraint to carog. The term "vertical restraint" refers generally to the portion of the restraint assembly 100 that provides vertical restraint (i.e., the modifier "vertical" does not refer to the orientation or extension direction of the restraint). In FIGS. 3C and 4C, the restraint assembly is shown in a raised position (e.g., deployed position). The lateral restraint 110 includes a guide face 115 configured to engage lateral sides of cargo, such as ULDs, to provide longitudinal guidance while conveying the cargo and/or to provide lateral restraint to the cargo. The lateral restraint 110 may also include a chamfered forward edge and/or a chamfered aft edge 116. That is, the guide face 115 of the lateral restraint 110 may include at least one of a forward chamfer and an aft chamfer. This chamfered edge may facilitate engagement with the conveyed cargo.

In various embodiments, and with reference to FIGS. 3A and 4A, the lateral restraint 110 is rotatably coupled (e.g., via a first rotational axis 101) to the tray (e.g., rail 30a or 30b) of the cargo system. The first rotational axis 101 may be parallel to the longitudinal axis of the tray (e.g., may be parallel to the direction in which cargo is configured to be conveyed along the trays). The restraint assembly 100 may include one or more features that function as a base 95 (FIG. 3A) for mounting the assembly to the tray. That is, the restraint assembly 100 may include a base 95 through which one or more studs or other fastening features may be utilized to mount the restraint assembly 100 to one or both of the rails 30a, 30b that form the tray. As shown in FIGS. 3A and 4A, the restraint assembly 100 is shown in the stored position, with both the lateral restraint 110 and the vertical restraint disposed within a volume defined by the tray (i.e., within a volume defined between the two rails 30a, 30b). FIGS. 3B and 4B show the restraint assembly 100 partially deployed, with the lateral restraint 110 rotated upward such that at least the guide face 115 is disposed above the conveyance plane.

In various embodiments, and with reference to FIGS. 3C and 4C, the vertical restraint 120 is rotatably coupled to the lateral restraint 110 via a second rotational axis 102. The second rotational axis 102 may be parallel to the longitudinal axis of the tray (e.g., may be parallel to the direction in which cargo is configured to be conveyed along the trays). In various embodiments, this coupling between the lateral restraint 110 and the vertical restraint 120 is along a top edge 112 of the lateral restraint 110. Because of the rotational coupling between the lateral restraint 110 and the vertical restraint 120, the vertical restraint 120 can be rotated, relative to the lateral restraint 110, through arcuate rotation 114 in order to transition the restraint assembly 100 from the partially deployed position shown in FIGS. 3B and 4B to the fully raised position. In the raised position, the vertical restraint 120 may extend in a lateral direction and thus may extend substantially perpendicular to the lateral restraint 110.

In various embodiments, and with reference to FIG. 4C, the lateral restraint 110 may have a reverse face 117, opposite the guide face 115. In the stored position (FIGS. 3A and 4A), the vertical restraint 120 may be disposed and may extend directly adjacent to the reverse face 117 of the lateral restraint 110. In such embodiments, the vertical restraint 120 is not stored on the side of the lateral restraint 110 where the guide face 115 is located, thus enabling the restraint assembly 100 to be initially configured in the partially deployed position shown in FIGS. 3B and 4B with cargo engaged against (or at least disposed adjacent to) the guide face 115. With cargo so disposed adjacent the guide face 115 and with the vertical restraint disposed adjacent the reverse face 117, the vertical restraint is not prevented from rotating to the fully deployed position shown in FIGS. 3C and 4C. That is, even with cargo already being restrained by the lateral restraint 110, the vertical restraint 120 can still be deployed, due to its stored configuration adjacent the reverse face 117 of the lateral restraint 110. In such embodiments, and returning to the arcuate rotation 114 mentioned above with reference to FIG. 3C, the vertical restraint 120 may be configured to rotate through more than 180 degrees of arc. In various embodiments, toggling between the stored position and the raised position includes rotating the vertical restraint 120 through about 270 degrees of arc. As used in this context only, the term "about" means plus or minus 30 degrees. In various embodiments, the lateral restraint may be disposed adjacent the guide face and thus may rotate through an arc of rotation that is about 90 degrees.

In various embodiments, instead of the restraints 110, 120 being independently or sequentially deployed, as described immediately above, the lateral restraint 110 and the vertical restraint may transition between the stored and raised position together. That is, actuation of the lateral restraint 110 may automatically trigger actuation of the vertical restraint 120 (or vice-versa). In various embodiments, the length of the guide face 115 of the lateral restraint 110, as measured parallel to the longitudinal axis of the tray of the cargo system, is greater than a height of the guide face 115 (the height being a vertical dimension of the guide face 115, perpendicular to the length). With the length being greater than the height, the guide face 115 has a sufficient dimension to maintain engagement with cargo, even when such cargo has pockets or indentations along its lateral side.

Figure 5:
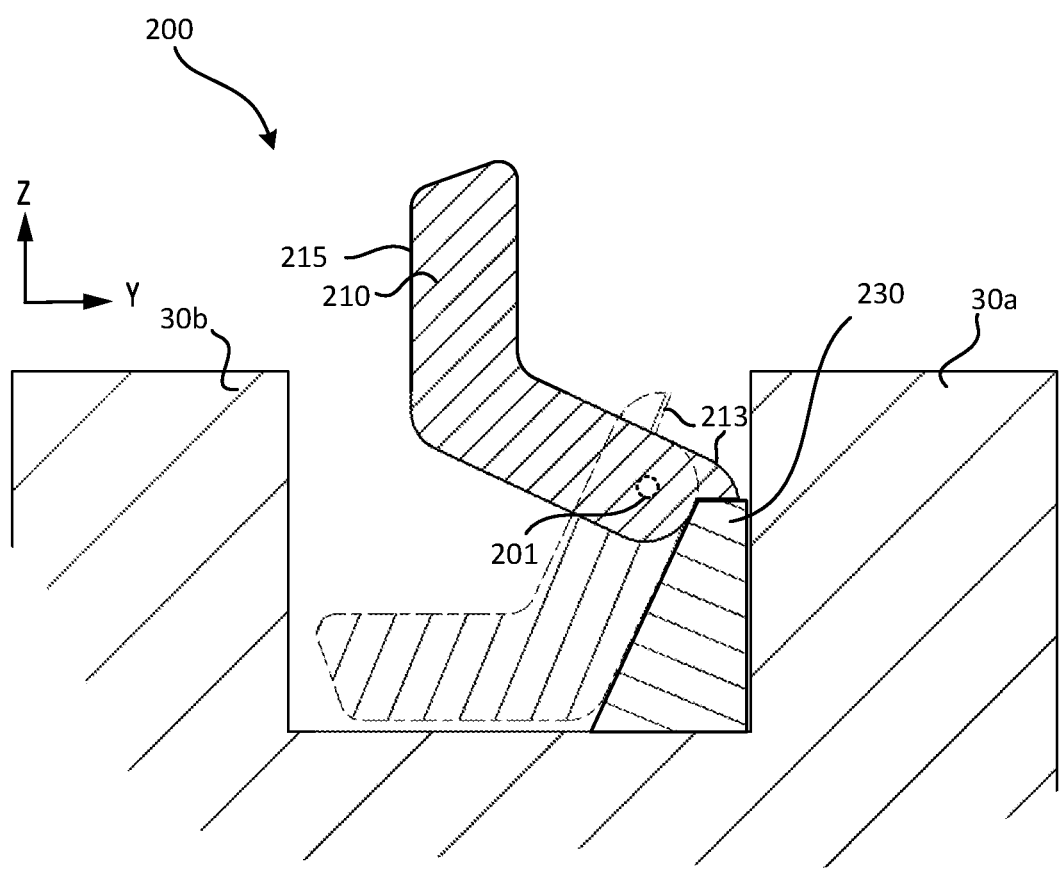
FIG. 5 illustrates a schematic view of a support wedge and a restraint assembly installed in a volume defined by a tray of a cargo system, in accordance with various embodiments.

In various embodiments, and with reference to FIG. 5, a schematic depiction of a restraint assembly 200 having a support wedge 230 is provided. The support wedge 230 may be disposed within the volume defined by the tray, and may be configured to facilitate load path transfer from the lateral restraint 210 to the tray. The lateral restraint 210 may be rotatable about a first rotational axis 201, thus allowing the lateral restraint to be toggled between a raised position and a stored position. For example, the lateral restraint 210 may include a tab 213 that engages the support wedge 230 when the lateral restraint 210 is in the raised position, thus reinforcing the lateral restraint 210 and facilitating transfer of a force applied against the guide face 215 of the lateral restraint to the tray (i.e., one of the rails 30a, 30b).

Figure 6:
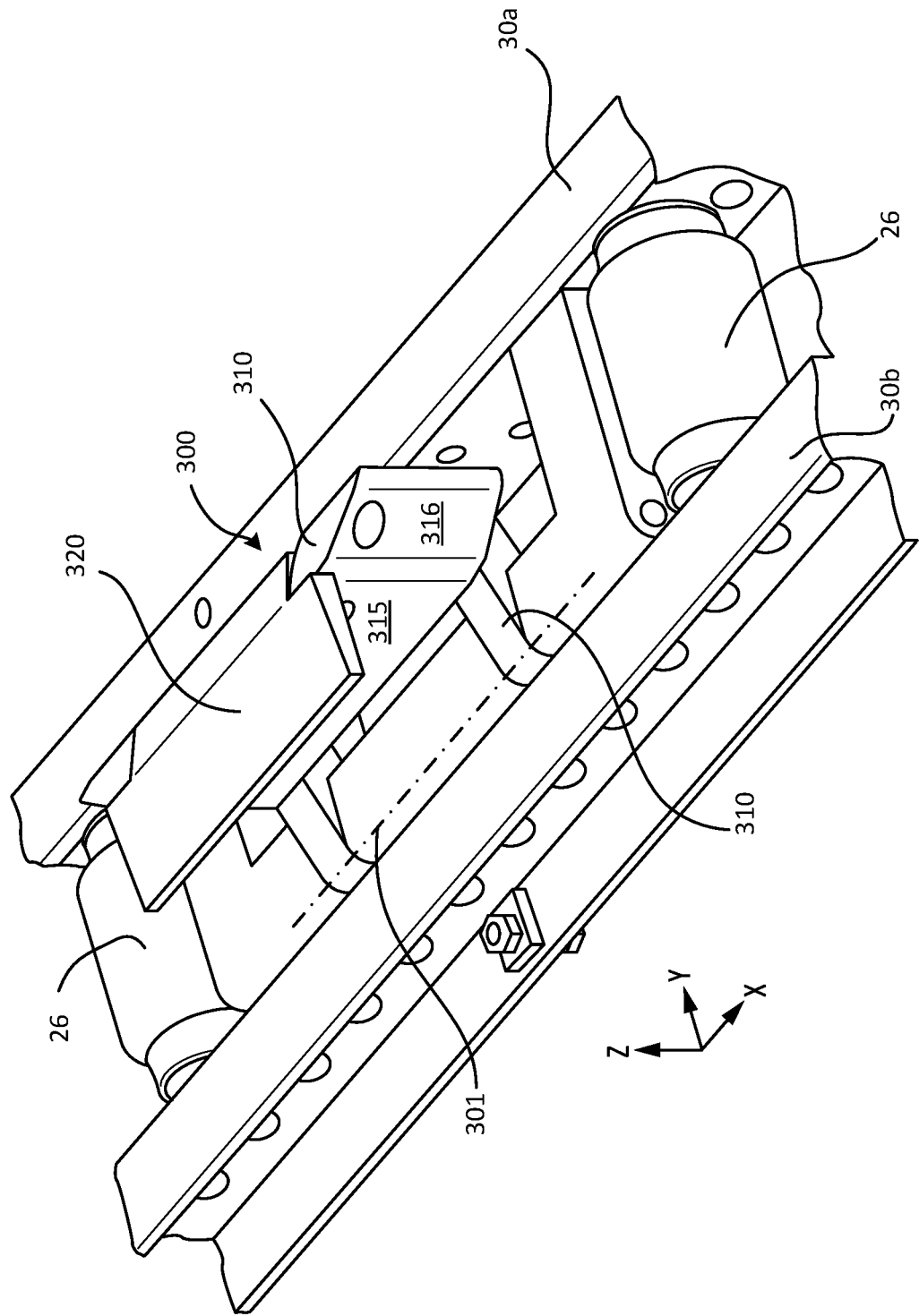
FIG. 6 illustrates a restraint assembly, in a raised position, installed in a tray of a cargo system, in accordance with various embodiments.

In various embodiments, and with reference to FIG. 6, the first rotational axis 301, instead of being positioned near the back rail 30a, as shown in FIGS. 3A-4C, is positioned near the front rail 30b. That is, the earlier figures showed the first rotational axis disposed on a side of the volume opposite the guide face (in the raised position), but in FIG. 6 the first rotational axis 301 of the lateral restraint 310 of the restraint assembly 300 is disposed on a side of the volume that the guide face 315 is facing. The vertical restraint 320 may be configured as described above with reference to FIGS. 3A-4C.

Figure 7:
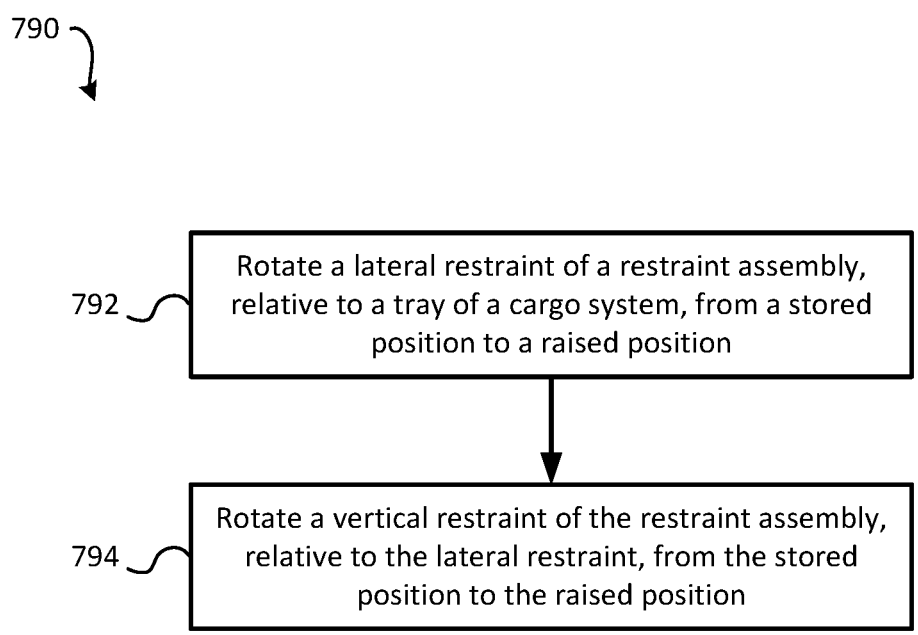
FIG. 7 is a schematic flow chart diagram of a method for guiding cargo, in accordance with various embodiments.

In various embodiments, and with reference to FIG. 7, a method 790 for guiding and/or restraining cargo is provided. The method 790 may include rotating a lateral restraint of a restraint assembly, relative to a tray of a cargo system, from a stored position to a raised position at step 792. The method may also include rotating a vertical restraint of the restraint assembly, relative to the lateral restraint, from the stored position to the raised position at step 794. In the stored position the lateral restraint and vertical restraint are disposed within a volume defined by the tray of the cargo system and in the raised position the vertical restraint and at least a guide face of the lateral restraint are disposed above the volume. In various embodiments, step 794 includes rotating the vertical restraint more than 180 degrees. In various embodiments, step 792 triggers step 794 (e.g., via a spring loaded mechanism). The method steps may be reversed, with respect to movement of the components of the restraint assembly, to move the assembly from the raised position to the stored position. In various embodiments, the various steps of the method 790 may include actuating various latches or other such fasteners.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure.

The scope of the disclosure is accordingly to be limited by nothing other than the appended claims, in which reference to an element in the singular is not intended to mean "one and only one" unless explicitly so stated, but rather "one or more." It is to be understood that unless specifically stated otherwise, references to "a," "an," and/or "the" may include one or more than one and that reference to an item in the singular may also include the item in the plural. All ranges and ratio limits disclosed herein may be combined.

Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

The steps recited in any of the method or process descriptions may be executed in any order and are not necessarily limited to the order presented. Furthermore, any reference to singular includes plural embodiments, and any reference to more than one component or step may include a singular embodiment or step. Elements and steps in the figures are illustrated for simplicity and clarity and have not necessarily been rendered according to any particular sequence. For example, steps that may be performed concurrently or in different order are illustrated in the figures to help to improve understanding of embodiments of the present disclosure.

Any reference to attached, fixed, connected or the like may include permanent, removable, temporary, partial, full and/or any other possible attachment option. Additionally, any reference to without contact (or similar phrases) may also include reduced contact or minimal contact. Surface shading lines may be used throughout the figures to denote different parts or areas but not necessarily to denote the same or different materials. In some cases, reference coordinates may be specific to each figure.

Systems, methods and apparatus are provided herein. In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A restraint assembly of a cargo system, the restraint assembly comprising:
   a lateral restraint comprising a guide face, wherein the lateral restraint is configured to be rotatably coupled to a tray of the cargo system; and
   a vertical restraint rotatably coupled to the lateral restraint;
   wherein:
      the restraint assembly is configured to have a stored position and a raised position;
      in the stored position both the lateral restraint and the vertical restraint are configured to be disposed within a volume defined by the tray of the cargo system;
      in the raised position the vertical restraint and at least the guide face of the lateral restraint are configured to be disposed above the volume defined by the tray of the cargo system such that the restraint assembly provides at least one of longitudinal guidance, lateral restraining, and vertical restraining to cargo;
      the lateral restraint comprises a reverse face opposite the guide face;
      in the stored position the vertical restraint is disposed and extends directly adjacent to the reverse face of the lateral restraint; and
      in the raised position the vertical restraint is non-parallel with the lateral restraint and extends in a direction the guide face is facing.

2. The restraint assembly of claim 1, wherein:
   the lateral restraint comprises a top edge, as defined with the restraint assembly in the raised position; and
   the vertical restraint is rotatably coupled to the top edge of the lateral restraint.

3. The restraint assembly of claim 2, wherein:
   the tray of the cargo system extends along a longitudinal axis;
   the lateral restraint is configured to be coupled to the tray via a first rotational axis; and
   the first rotational axis is parallel to the longitudinal axis.

4. The restraint assembly of claim 3, wherein:
   the vertical restraint is coupled to the lateral restraint via a second rotational axis; and
   the second rotational axis is parallel to the longitudinal axis.

5. The restraint assembly of claim 1, wherein toggling between the stored position and the raised position comprises rotating the vertical restraint, relative to the lateral restraint, more than 180 degrees.

6. The restraint assembly of claim 1, wherein toggling between the stored position and the raised position comprises rotating the vertical restraint, relative to the lateral restraint, about 270 degrees.

7. The restraint assembly of claim 1, wherein a length of the guide face of the lateral restraint, as measured parallel to a longitudinal axis of the tray of the cargo system, is greater than a height of the guide face, the height being perpendicular to the length.

8. The restraint assembly of claim 1, wherein the guide face comprises at least one of a forward chamfer and an aft chamfer.

9. The restraint assembly of claim 1, wherein rotation of the lateral restraint relative to the tray and rotation of the vertical restraint relative to the lateral restraint are independently actuatable.

10. The restraint assembly of claim 1, wherein rotation of the lateral restraint relative to the tray is configured to trigger rotation of the vertical restraint relative to the lateral restraint.

11. A cargo system comprising:
    a tray defining a volume within which a roller is housed, wherein the rollers are configured to facilitate movement of cargo along a longitudinal axis the tray;
    a restraint assembly rotatably coupled to the tray, the restraint assembly comprising a stored position and a raised position, wherein in the stored position the restraint assembly is disposed within the volume defined by the tray and in the raised position the restraint assembly is disposed above the volume defined by the tray of the cargo system such that the restraint assembly provides at least one of longitudinal guidance, lateral restraining, and vertical restraining to cargo; and
    a support wedge disposed within the volume, wherein the restraint assembly comprises a tab configured to engage the support wedge in the raised position such that the support wedge provides a load path from the restraint assembly to the tray.

12. The cargo system of claim 11, wherein the restraint assembly comprises:
    a lateral restraint comprising a guide face, wherein the lateral restraint is rotatably coupled to the tray via a first rotational axis; and
    a vertical restraint rotatably coupled to the lateral restraint via a second rotational axis.

13. The cargo system of claim 12, wherein both the first rotational axis and the second rotational axis are parallel to the longitudinal axis of the tray.

14. The cargo system of claim 12, wherein the first rotational axis is disposed on a side of the volume opposite the guide face of the lateral restraint in the raised position.

15. The cargo system of claim 12, wherein the first rotational axis is disposed on a side of the volume that the guide face of the lateral restraint is facing in the raised position.

16. A method for guiding cargo, the method comprising:
    rotating a lateral restraint of a restraint assembly, relative to a tray of a cargo system, from a stored position to a raised position; and
    rotating a vertical restraint of the restraint assembly, relative to the lateral restraint, from the stored position to the raised position, wherein rotating the vertical restraint between the stored position and the raised position comprises rotating the vertical restraint, relative to the lateral restraint, about 270 degrees;
    wherein in the stored position the lateral restraint and the vertical restraint are disposed within a volume defined by the tray of the cargo system and in the raised position the vertical restraint and at least a guide face of the lateral restraint are disposed above the volume.

17. The method of claim 16, wherein rotating the lateral restraint triggers rotation of the vertical restraint.

* * * * *